United States Patent Office 3,631,220
Patented Dec. 28, 1971

3,631,220
CURABLE ORGANOSILICON COMPOSITIONS
Lawrence F. Wojdac, Midland, Mich., assignor to Dow Corning Corporation, Midland, Mich.
No Drawing. Continuation-in-part of application Ser. No. 20,027, Mar. 16, 1970. This application May 8, 1970, Ser. No. 35,939
Int. Cl. C08g 47/02
U.S. Cl. 260—825      12 Claims

ABSTRACT OF THE DISCLOSURE

Solventless liquid monophenyl-methylvinylsiloxane resins, containing at least 20 mol percent dimethylsiloxy units, mixed with minor amounts of a low-viscosity fluid siloxane and the ≡SiH containing reaction product of methyl-hydrogen siloxanes and alpha-methyl styrene, are cured by heating in the presence of a platinum catalyst to provide a strong, heat-stable resin which can be used in laminates, coil coatings and the like.

---

This application is a continuation-in-part of pending application Ser. No. 20,027, filed Mar. 16, 1970, now abandoned.

This invention relates to curable organosilicon compositions. More particularly, the invention relates to a solventless liquid organosilicon resin containing a novel compatible cross-linking agent which, when cured, exhibits desirable characteristics of strength and thermal stability.

Organosiloxane resins in which the substituent organic groups are methyl, phenyl, vinyl and/or other organic groups are well known. These resins are cured by a variety of mechanisms, such as by cross-linking through a vinyl group or by the platinum catalyzed reaction of ≡SiH groups with alkenyl radicals, to form hard infusible materials. The properties of these organosiloxane resins, such as toughness, high dielectric capacity, resistance to thermal decomposition and retention of strength at high temperatures, make them useful in many different applications.

Certain applications, such as encapsulating electrical components and coating of coils for electric motors, provide a very severe environment for the use of presently available resins. The resins must be strong, yet flexible and must retain their strength under repeated thermal shock. Also, the resin must cure without the evolution of volatiles, such as solvents or water, in order to avoid the formation of bubbles and/or voids in the coating.

According to the present invention, there is provided an organosilicon composition having the described desirable properties which consists essentially of a mixture of (a) a solventless liquid organosilicon resin composed of 30 to 65 mol percent $C_6H_5SiO_{3/2}$ units, 15 to 30 mol percent $CH_3(CH_2=CH)SiO$ units, and 20 to 40 mol percent $(CH_3)_2SiO$ units, and 0 to 5 mol percent $R_3SiO_{1/2}$ units in which R is selected from the group consisting of lower alkyl radicals of from 1 to 4 inclusive carbon atoms, the vinyl radical and the phenyl radical, at least one R substituent being a lower alkyl radical, the resin having a silicon-bonded hydroxyl content of no more than 1 weight percent; (b) 1 to 20 percent by weight, based on the weight of the (a) and (b), of a linear organopolysiloxane, containing at least one vinyl substituent, compatible with (a), of the formula $$CH_3R'_2SiO(R''_2SiO)_nSiR'_2CH_3$$

in which R' is selected from the group consisting of lower alkyl radicals of from 1 to 4 inclusive carbon atoms, the vinyl radical and the phenyl radical, R" is selected from the group consisting of lower alkyl radicals of from 1 to 4 inclusive carbon atoms, the vinyl radical and the phenyl radical, at least 15 mol percent of the R" radicals being phenyl radicals, and $n$ has a value of from 2 to 20; (c) an organopolysiloxane, compatible with (a) and (b), having an average of at least 2 silicon-bonded hydrogen atoms per molecule, this organopolysiloxane being the reaction product of methylhydrogenpolysiloxane having an average degree of polymerization of from 3 to 6 with sufficient alpha-methyl styrene to react with one hydrogen atom per 3 to 6 hydrogen atoms present in the methylhydrogenpolysiloxane, the reaction product being present in the mixture in an amount sufficient to provide from 0.75 to 1.5 mol of ≡SiH per mol of vinyl substituents in (a) and (b); and (d) a platinum catalyst.

The above described composition is cured at elevated temperatures. Substantially complete curing can be obtained by heating the resin composition at from 150 to 200° for a period of from 4 to 10 hours. Curing is effected by the platinum catalyzed reaction of the ≡SiH containing component (c) with the vinyl substituents of the resin (a). Although the mixture of these components has a shelf life of approximately 2 weeks, it is preferable that the curable composition be used within a few hours after mixing of the four ingredients. The uncured compositions of this invention are fluid materials which are readily pourable and can be used to impregnate complicated electrical components. They can also be used to form cast articles of any desired shape.

It is believed that the combination of desirable properties in the cured organosilicon compositions of the invention result from "tailoring" the individual components so that they are compatible with one another. This compatability is evidenced by a lack of separation of the components after mixing and the clear product which is obtained upon curing. With respect to the solventless organosiloxane resin (a), compatibility is obtained only when the resin contains at least 20 mol percent dimethylsiloxy units. The monophenylsiloxy units in the resin provide strength and high temperature stability; the upper limit, 65 mol percent, being the point at which the resin becomes brittle and inflexible. As described before, the methylvinylsiloxy units provide cross-linking sites in the resin and contribute to its ultimate strength. Generally these resins have a viscosity in the range of from 10,000 to 1,000,000 cs. when measured at 25° C. The hydroxyl content of this particular resin cannot exceed 1 weight percent or else there are excessive voids formed during curing since hydrogen is evolved and water, a volatile, is also formed. It is preferred that the resin contain less than 0.5 weight percent silicon-bonded hydroxyl groups.

The triorganosiloxy units, for example $(CH_3)_3SiO_{1/2}$ or $CH_3(C_6H_5)(CH_2=CH)SiO_{1/2}$, are optional components of resin (a). When present, the triorganosiloxy units provide for lower viscosities, for example 5000 cs., in the resin. The lower viscosity materials have particular utility in coating intricate electrical components. If desired, a blend of resins, one containing the optional $R_3SiO_{1/2}$ units and the other not, can be mixed by the user to obtain the particular viscosity necessary in his application. If physical properties of the cured composition are not of prime consideration, greater amounts of the $R_3SiO_{3/2}$ units can be incorporated into the resin to obtain even lower viscosities.

The resin component (a) may be prepared by hydrolyzing the corresponding chlorosilanes in the conventional manner for preparing siloxane resins. If the residual hydroxyl content of such a hydrolyzate is above the 1 weight percent limit, the hydrolysis product can be reacted with KOH and then neutralized to obtain a resin of the necessary low hydroxyl content.

The component (b) includes polysiloxanes such as (CH$_2$=CH)(CH$_3$)$_2$SiO[(CH$_3$)C$_6$H$_5$SiO]$_4$
　　　　　　　　　　　SiCH$_3$(C$_6$H$_5$)(CH=CH$_2$)

(CH$_3$)$_3$SiO[(CH$_3$)C$_6$H$_5$SiO]$_8$Si(CH$_3$)$_2$CH=CH$_2$ (CH$_2$=CH)CH$_3$(C$_6$H$_5$)SiO[(C$_6$H$_5$)$_2$SiO]$_6$
　　　　　　　　　　　SiCH$_3$(C$_6$H$_5$)(CH=CH$_2$)

(C$_6$H$_5$)$_2$SiO[(CH$_3$)C$_6$H$_5$SiO]$_2$SiCH$_3$(C$_6$H$_5$)(CH=CH$_2$)

(CH$_3$)$_3$SiO[CH$_3$(CH$_2$=CH)SiO]$_1$[C$_6$H$_5$
　　　　　　　　　　　(CH$_3$)SiO]$_3$Si(CH$_3$)$_2$C$_6$H$_5$ (CH$_2$=CH)(CH$_3$)C$_6$H$_5$SiO[CH$_3$(CH$_2$=CH)SiO]$_2$
　　[C$_6$H$_5$(CH$_3$)SiO]$_9$Si(CH$_3$)(C$_6$H$_5$)CH=CH$_2$, and CH$_3$)$_2$C$_6$H$_5$SiO[CH$_3$(CH$_2$=CH)SiO]$_1$
　　[C$_6$H$_5$(CH$_3$)SiO]$_{14}$Si(CH$_3$)(C$_6$H$_5$)CH=CH$_2$ These polysiloxanes are relatively low viscosity fluids, generally having a viscosity of from 50 to 2500 cs. when measured at 25° C. By including at least 15 mol percent phenylyl substituents on the silicon atoms forming the diorganosiloxy backbone, the vinyl fluid is made compatible with the resin (a). The copolymeric fluid must contain at least one vinyl-substituted silicon atom preferably two, in order that it will react with ≡SiH and be "immobilized" in the cured product. The fluid is believed to provide flexibility and thermal shock resistance in the cured product, without significantly reducing its strength.

The copolymeric fluid (b) can be prepared by any of the conventional methods for preparing triorganosilyl end-blocked diorganopolysiloxanes. This can be done for example by cohydrolyzing and condensing the appropriate chloro and/or alkoxy silanes, or by equilibrating the appropriate hexaorganodisiloxane with the appropriate diorganopolysiloxane in the presence of an alkaline or acid catalyst.

The cross-linking agent (c) or ≡SiH source in the organosilicon mixture is the reaction product of methylhydrogenpolysiloxanes with alpha-methylstyrene. The reaction is catalyzed by platinum and is carried out at from 100 to 150° C. for from 2 to 10 hours. Sufficient alpha-methylstyrene is added to the reaction mixture so that there is reaction with one hydrogen per every 3-6 hydrogens present in the siloxane. Reacting greater amounts of alpha-methylstyrene reduces the effectiveness of the cross-linker and lesser amounts render the component (c) incompatible with the other components.

The methylhydrogenpolysiloxane precursor can be a cyclic or linear polymer or a mixture thereof, so long as the average degree of polymerization of the methylhydrogensiloxy units is in the range of from 3 to 6. Linear copolymers can contain triorganosilyl end-blocking units, such as trimethylsilyl units, and thus they can contain up to an average of 8 silicon atoms. Specific examples of the precursor include: (CH$_3$)$_3$SiO[(CH$_3$)HSiO]$_3$Si(CH$_3$)$_3$,

[(CH$_3$)HSiO]$_3$, [(CH$_3$)HSiO]$_4$ (CH$_3$)$_3$SiO[(CH$_3$)HSiO]$_4$Si(CH$_3$)$_3$ (C$_2$H$_5$)$_3$Si[(CH$_3$)HSiO]$_5$Si(C$_2$H$_5$)$_3$, [(CH$_3$)HSiO]$_5$

[(CH$_3$)HSiO]$_6$ and (CH$_3$)$_3$SiO[(CH$_3$)HSiO]$_6$Si(CH$_3$)$_3$.

When a mixture of the methylhydrogenpolysiloxane precursor is used, the mixture can contain small amounts (on more than 10 weight percent) of the disiloxane (d.p. of 2) and species having a degree of polymerization of greater than 6. In these small amounts, the compatibility of the reaction product (c) with the other components is not adversely affected. Preparation of the precursor or component (c) are well known in the art and many examples of such materials are commercially available. Thus, recitation of methods of manufacture of these materials would be redundant herein.

The alpha methylstyrene reaction products or cross-linking agents (c) are exemplified by:

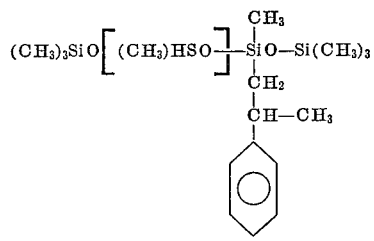

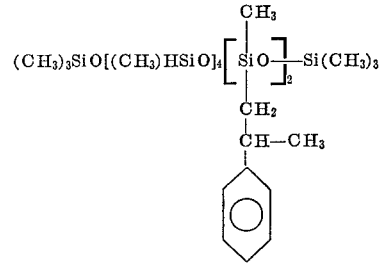

and

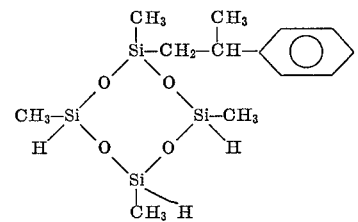

The amount of cross-linker (c) in the organosilicon mixture will vary with the amount of resin component (a), the amount of vinyl groups in the resin, and the amount of and vinyl content of component (b), but in all cases there is a sufficient cross-linker present to provide from 0.75 to 1.5 mole of ≡SiH per mol of vinyl substituents in the mixture. Preferably to obtain maximum efficiency of cross-linking there in one mole of ≡SiH per mol of vinyl substituents in the organosilicon mixture. Generally, the cross-linker is added in an amount in the range of 5 to 20 weight percent based on the weight of resin (a).

The platinum component (d) can be of the known forms, ranging from platinum as such or as deposited on carriers such as silica gel or powdered charcoal, to platinic chloride, salts of platinum and chloroplatinic acid. Any of these forms will function in the instant curable composition. A preferred form of platinum is chloroplatinic acid, either as the commonly available hexahydrate or the anhydrous form, on account of its easy dispersibility in the organosilicon system and its lack of effect on color of the mixture. Additional platinum compounds having utility as catalysts include PtCl$_2$[P(CH$_2$CH$_2$CH$_3$)$_3$]$_2$, platinum bromides, a complex of platinous halide and an olefin such as ethylene propylene, butylene, cyclohexane and styrene Pt(CH$_3$CN)$_2$Cl, [Pt(CH$_3$CN)$_2$(CH$_3$)$_4$]Cl$_2$
Pt(NH$_3$)$_2$Cl$_2$, K[PtCl$_3$CH$_2$CH$_2$OH]
PtBr$_2$(C$_2$H$_4$)$_2$, K[PtBr$_3$(C$_2$H$_4$)], PtCl$_2$(C$_2$H$_4$)
(CH$_3$)$_2$C=CH$_2$·PtCl$_2$, H$_2$Pt(CN)$_4$·5H$_2$O
H[PtCl$_3$(CH$_3$CN)], Pt(NH$_3$)$_2$(CNS)$_2$
[Pt(NH$_3$)$_4$]·[PtCl$_4$], PtCl$_2$[P(CH$_2$CH$_3$)$_3$]$_2$
PtCl$_2$·PCl$_3$, Pt$_2$Cl$_2$·P(OH)$_3$, PtCl$_2$/P(OCH$_2$CH$_3$)$_3$
PtCl$_2$·[P(OCH$_2$CH$_3$)$_3$]$_2$, Pt(OOCCH$_2$SCH$_2$CH$_3$)$_2$
Pt(CN$_3$), (CH$_3$)$_4$Pt, (CH$_3$)$_3$Pt—Pt(CH$_3$)$_3$

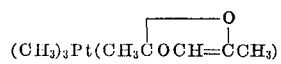

PtCl$_2$CO and PtBr$_2$CO.

There should be at least 0.1 part by weight platinum per million parts by weight of the combined total weight of (a), (b) and (c). However, since impurities in the system may readily poison the small quantity of catalyst it is preferred to employ from 1 to 20 parts by million of platinum. A greater amount of platinum does not effect the reaction but economic considerations suggest usage within the mentioned limits.

In addition to the above described components, other materials can be present in the compositions of the invention. Such materials as are ordinarily used in organosilicon compositions, for example, fillers, such as carbon black, silica, aerogels, treated silica, alumina, clay, metal oxides, metal carbonates, metal silicates, etc.; pigments to impart a particular color to the materials; plasticizers and the like can be added to the described compositions. The fillers are generally added in an amount in the range of from 20 to 150 parts filler per 100 parts of curable composition. Materials that are known to poison platinum catalysts should, of course, be excluded and are not normally included in organosilicon compounds designed to be cured by heat activated catalysts.

The curable compositions of the invention are solventless liquids which can be used as casting resins, as molding compound when mixed with fillers and as coatings on a variety of substrates, such as metal, wood, stone, ceramic thermoplastics and thermoset resins. Such coatings can be applied by dipping, brushing or other conventional techniques. A cured coating of these organosilicon compositions on a metal surface acts as a heat-stable electrical insulation. Particularly useful curable compositions for coating motor coils and other electrical components are those composed of a mixture of resin (a) which contains 30 mol percent monophenylsiloxy units, 15 to 25 mol percent methylvinylsiloxy units and 25 to 35 mol percent dimethyl siloxy units; 3 to 8 weight percent based on the weight of (a), of the fluid (b) and 12 to 18 weight percent, based on the weight of (a), of the cross-linking agent (c) with from 3 to 10 parts of the platinum catalyst (chloroplatinic acid) per million parts of the parts by weight of the other components.

The following examples are illustrative and should not be construed as limiting the invention which is properly delineated in the appended claims.

EXAMPLE 1

A mixture of 50 mol percent $C_6H_5SiCl_3$, 20 mol percent $CH_2=CH(CH_3)SiCl_2$ and 30 mol percent $(CH_3)_2SiCl_2$ was hydrolyzed by addition of the mixture to sufficient water to form 20 percent HCl in the aqueous phase of the reaction product. After reacting for one hour, the aqueous phase was decanted and the resin was washed with water and azeotroped dry. The liquid resin was dissolved in sufficient toluene to form a 40 percent solution and reacted with 0.2 weight percent KOH by heating at the toluene reflux temperature with continuous removal of water. After this reaction to reduce the residual silanol content, the resin was stripped of solvent by heating to 120° C. under vacuum. The product, a liquid solventless resin, consisted of 50 mol percent $C_6H_5SiO_{3/2}$ units, 30 mol percent $CH_2=CH(CH_3)SiO$ units and 20 mol percent $(CH_3)_2SiO$ units having a residual ≡SiOH content of 0.2 weight percent and a viscosity of about 1,000,000 cs. when measured at 25° C.

EXAMPLE 2

A vinyl-endblocked polysiloxane was prepared by co-hydrolysis of 24.1 lbs. of $C_6H_5(CH_3)CH_2=CHSiCl$, 25.2 lbs. of $C_6H_5(CH_3)SiCl_2$ and 9.3 lbs. of $$CH_3(CH_2=CH)SiCl_2$$

This chlorosilane mixture was dissolved in toluene and the toluene mixture was added to 76 lbs. of water, addition being accomplished under the surface of the water. The resulting HCl/water phase was decanted and the hydrolyzate was washed with water. The product was azeotroped dry and 2 weight percent, based on the weight of siloxane, of an acid clay catalyst (Filtrol 13) was added and the mixture was heated at 90° C. for 7 hours to insure condensation of any residual silanols. The acid clay was removed by filtration and the solvent was stripped under vacuum to yield a 21 cs. fluid of the formula

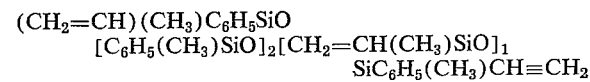

EXAMPLE 3

A mixture containing 50 percent linear trimethylsilyl-enblocked methylhydrogenpolysiloxanes having an average d.p. of 5 and 50 percent cyclic methylhydrogensiloxane (tetramer, pentamer and hexamer) was reacted with alpha-methyl styrene in the presence of a platinum catalyst. The polysiloxane (2000 grams), containing 6 parts per million platinum (as chloroplatinic acid) was heated while stirring to 110° C. and alpha-methyl styrene (655 grams) was added dropwise at a rate of about 20 grams/minute. After addition was complete, the reaction mixture was heated for 4 hours at 120° C.

The reaction product, a mixture of the described linear and cyclic siloxanes having an average of one hydrogen atom per six reacted with alpha-methylstyrene, was a fluid having a viscosity of 9.1 cs. when measured at 25° C. The fluid had a ≡SiH content of 1.03 weight percent.

EXAMPLE 4

One hundred pounds of the solventless resin of Example 1 (component $a$) was mixed with 18.4 lbs. of the polysiloxane fluid of Example 2 (component $b$). Mixing was accomplished at 50° C. with mild agitation. To this mixture was added 6.2 lbs. of the reaction product of Example 3 (component $c$) and 0.6 lb. of a chloroplatinic acid-containing catalyst, sufficient to provide 6 parts platinum per million parts of (a), (b), and (c). After mixing, the composition was vacuum degassed to remove any entrained air.

The above-described composition, having a viscosity of about 2000 cs., was cast into 4 x 4 x ¼ inch samples. The resin composition was cured at 175° C. for 4 hours. The castings were clear and uniform, indicating compatibility of all components. The cured resin had a flexural strength of about 3300 p.s.i.

EXAMPLE 5

For purposes of comparison, the mixture of components (a) and (b) described in Example 4 was mixed with an equal amount of the same platinum catalyst and 6.2 lbs. of a trimethylsilyl-endblocked methylhydrogenpolysiloxane having a d.p. of about 35. The mixture was incompatible as evidenced by its milky white appearance. The composition did not cure to a resin after 4 hours at 175° C. After an additional 2 hours at 200° C., the cured composition remained an elastomeric material.

As a further indication of the necessity of the low degree of polymerization in the cross-linker, the above-described siloxane (d.p. of 35) was reacted with alpha-methyl styrene in the manner described in Example 3 and substituted as the cross-linker (c) in the curable composition formulation of Example 4. After casting, the composition was cured at 175° C. for 4 hours. The cured sample was clear but the surface was rough and mottled because of the incompatibility. The cured resin had a flexural strength of 1150 p.s.i.

EXAMPLE 6

The curable composition of Example 4 was mixed with sufficient naturally-occurring silica to form a flowable molding composition containing 50 weight percent filler.

After curing for 4 hours at 175° C., the material had the following properties

| | |
|---|---|
| Flex strength, p.s.i. | 3800 |
| Impact strength, ft./lbs. | 0.3 |
| Dielectric constant | 3.2 |
| Dissipation factor | 0.0006 |
| Arc resistance, sec. | 193 |

EXAMPLE 7

To demonstrate the effect of the optional $R_3SiO_{1/2}$ units in the resin component, the following resins were prepared by hydrolysis of the corresponding chlorosilanes:

| Resin formulation | Mol percent | | | | Viscosity at 25° C. (cs.) |
| | $C_6H_5SiO_{3/2}$ | $CH_3(CH_2{=}CH)SiO$ | $(CH_3)_2SiO$ | $CH_2{=}CH(CH_3)_2SiO_{1/2}$ | |
|---|---|---|---|---|---|
| A | 48 | 20 | 30 | 2 | 106,800 |
| B | 45 | 20 | 30 | 5 | 5,040 |
| C | 43 | 25 | 30 | 2 | 8,545 |

Each of the resins (A, B and C) were mixed with the components described in Example 4 to form curable compositions having the proportion of different components described in Example 4. The compositions, A, B and C, had viscosities of 1060 cs., 241 cs. and 258 cs. respectively. When cast and cured at 175° C. for hours, flexural strengths of from 2000 to greater than 3000 p.s.i. were obtained.

These low viscosity compositions, having 2 to 5 mol percent of the triorganosiloxy units incorporated into the resin component, forms a specific embodiment of the invention which is particularly useful as a coil coating.

Other modification and variation are within the scope of the invention which is directed to novel curable organosilicon compositions.

That which is claimed is:
1. A curable organosilicon composition consisting essentially of a mixture of:
(a) a solventless liquid organosilicon resin consisting essentially of 30 to 65 mol percent $C_6H_5SiO_{3/2}$ units, 15 to 30 mol percent $CH_3(CH_2{=}CH)SiO$ units, 20 to 40 mol percent $(CH_3)_2SiO$ units and 0 to 5 mol percent $R_3SiO_{1/2}$ units in which R is selected from the group consisting of lower alkyl radicals of from 1 to 4 inclusive carbon atoms, the vinyl radicals and the phenyl radicals, at least one R substituent being a lower alkyl radical, said resin having a silicon-bonded hydroxyl content of no more than 1 weight percent;
(b) 1 to 20 percent by weight, based on the weight of (a) and (b) of a linear organopolysiloxane, containing at least one vinyl-substituted silicon atom, compatible with (a) of the formula $$CH_3R'_2SiO(R''_2SiO)_nSiR'_2CH_3$$

in which
R' is selected from the group consisting of lower alkyl radicals of from 1 to 4 inclusive carbon atoms, the vinyl radical, and the phenyl radical,
R'' is selected from the group consisting of lower alkyl radicals of from 1 to 4 inclusive carbon atoms, the vinyl radical and the phenyl radical, at least 15 mol percent of the R'' radicals being phenyl radicals,
n has a value of from 2 to 20;

(c) an organopolysiloxane compatible with (a) and (b) having an average of at least 2 silicon-bonded hydrogen atoms per molecule, said organopolysiloxane being the platinum catalyzed reaction product of methylhydrogenpolysiloxanes having an average degree of polymerization of from 3 to 6 with sufficient alpha-methylstyrene to react with one hydrogen atom per 3–6 hydrogen atoms present in the methylhydrogen-siloxane, said reaction product being present in the mixture in an amount sufficient to provide from 0.75 to 1.5 mol of $\equiv$SiH per mol of vinyl substituent in (a) and (b),
(d) a platinum catalyst.
2. The cured composition of claim 1.
3. The composition of claim 1 including a filler.
4. The composition of claim 1 wherein the platinum catalyst (d) is present in an amount in the range of from 1 to 20 parts by weight per million parts of the combined weight of (a), (b) and (c).
5. The composition of claim 1 wherein the catalyst (d) is chloroplatinic acid.
6. The composition of claim 1 wherein the linear organosiloxane (b) is

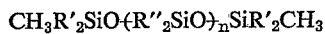

$(CH_2{=}CH)(CH_3)C_6H_5SiO[(CH_3)C_6H_5SiO]_2$
$[CH_2{=}CH(CH_3)SiO]SiC_6H_5(CH_3)(CH{=}CH_2)$

7. The composition of claim 1 wherein the resin (a) has a silicon-bonded hydroxyl content of less than 0.4 weight percent.
8. The composition of claim 1 wherein the resin (a) consists essentially of 45 to 55 mol percent $C_6H_5SiO_{3/2}$ units 15 to 25 mol percent $CH_3(CH_2{=}CH)SiO$ units and 25 to 35 mol percent $(CH_3)_2SiO$ units.
9. The composition of claim 1 wherein the $R_3SiO_{1/2}$ units are present in resin (a) in an amount in the range of from 2 to 5 mol percent.
10. The composition of claim 9 wherein the $R_3SiO_{1/2}$ units are vinyldimethylsiloxy units.
11. An article of manufacture comprising a metal surface coated with the organosilicon composition of claim 1.
12. An article in accordance with claim 9 wherein the organosilicon composition is cured.

References Cited

UNITED STATES PATENTS

| 3,020,260 | 2/1962 | Nelson | 260—825 |
| 3,249,581 | 5/1966 | Nelson | 260—825 |
| 3,284,406 | 11/1966 | Nelson | 260—825 |
| 3,436,366 | 4/1969 | Modic | 260—825 |

SAMUEL H. BLECH, Primary Examiner

U.S. Cl. X.R.

117—132 BS, 232; 260—37 SB, 46.5 U, 46.5 G, 448.2 U